US009080616B2

(12) United States Patent
Luipold et al.

(10) Patent No.: US 9,080,616 B2
(45) Date of Patent: Jul. 14, 2015

(54) TRANSMISSION PISTON WITH CONTAINED RETURN SPRING

(75) Inventors: Chris Luipold, Wadsworth, OH (US); Michael Van Sickle, Akron, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 969 days.

(21) Appl. No.: 13/225,784

(22) Filed: Sep. 6, 2011

(65) Prior Publication Data

US 2012/0061202 A1     Mar. 15, 2012

Related U.S. Application Data

(60) Provisional application No. 61/381,252, filed on Sep. 9, 2010.

(51) Int. Cl.
| F16J 1/00 | (2006.01) |
| F16D 25/12 | (2006.01) |
| F16D 25/0638 | (2006.01) |
| F16D 25/08 | (2006.01) |

(52) U.S. Cl.
CPC ............ *F16D 25/12* (2013.01); *F16D 25/0638* (2013.01); *F16J 1/008* (2013.01); *F16D 25/082* (2013.01); *F16D 2300/08* (2013.01)

(58) Field of Classification Search
CPC .............. F15B 15/1466; F15B 15/1452; F16D 25/0638; F16D 25/082; F16D 25/12; F16D 2300/08; F16J 1/008
USPC ........ 267/158, 159, 160, 161, 163; 92/130 B, 92/130 C, 130 R, 107, 108
See application file for complete search history.

(56) References Cited

U.S. PATENT DOCUMENTS

| 4,311,067 | A | * | 1/1982 | Froumajou | ..................... 74/718 |
| 4,821,627 | A | * | 4/1989 | Leigh-Monstevens | ......... 92/107 |
| 5,307,730 | A | * | 5/1994 | Erwin | ......................... 92/130 A |
| 5,893,445 | A | | 4/1999 | Dover | |
| 2008/0136075 | A1 | * | 6/2008 | Imaizumi | ...................... 267/161 |
| 2009/0188768 | A1 | * | 7/2009 | Harashima et al. | ............. 192/86 |
| 2010/0084241 | A1 | | 4/2010 | Morishita | |

FOREIGN PATENT DOCUMENTS

JP     2008-038945     2/2008

\* cited by examiner

*Primary Examiner* — Nathaniel Wiehe
*Assistant Examiner* — Abiy Teka
(74) *Attorney, Agent, or Firm* — Simpson & Simpson, PLLC

(57) ABSTRACT

A subassembly for a transmission including a seal having a protrusion, a piston including a tab, and a lip about said piston, wherein an axial gap is formed between said tab and said lip, said piston also including a hole corresponding to said protrusion and operatively arranged to receive said protrusion for securing seal to said piston, a spring element disposed in said axial gap between said tab and said lip, wherein said spring element includes a finger corresponding to said tab, wherein said finger is aligned with said tab for axially locking said spring element between said tab and said lip, and wherein said tab includes a recess operatively arranged for receiving said finger for rotationally locking said spring element to said piston.

13 Claims, 3 Drawing Sheets

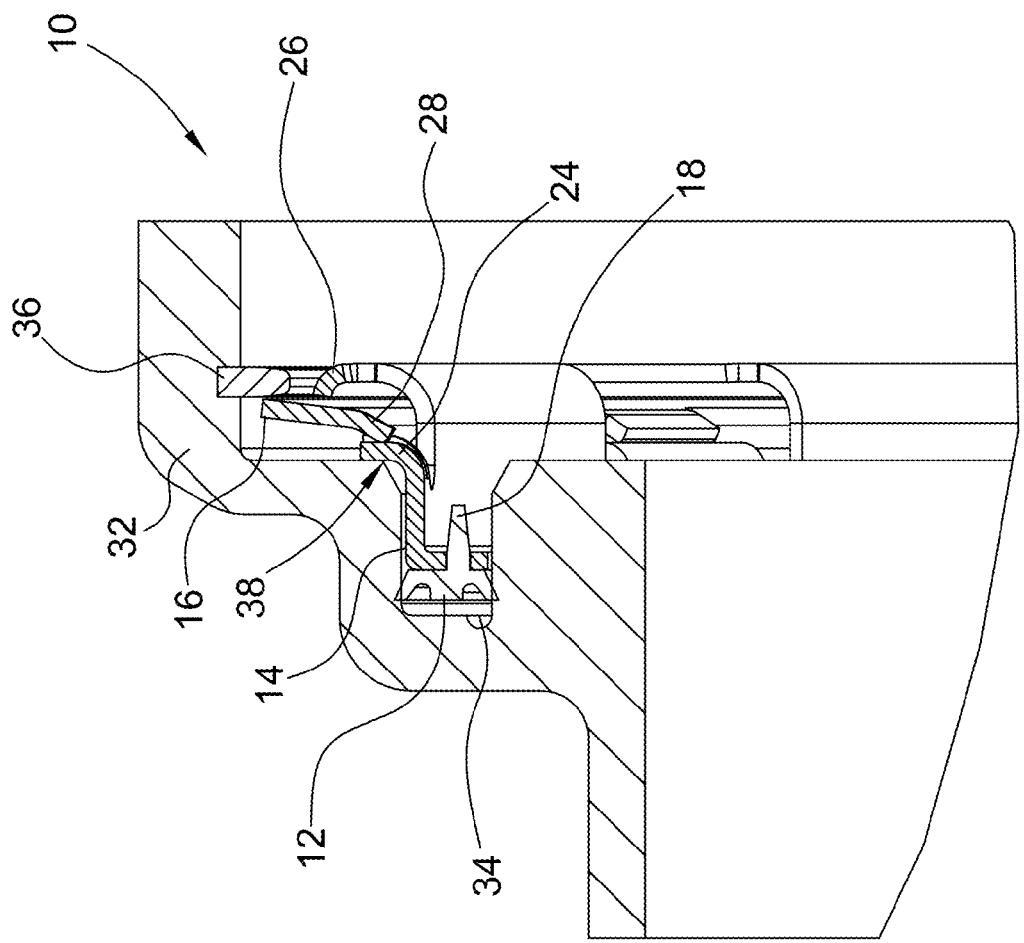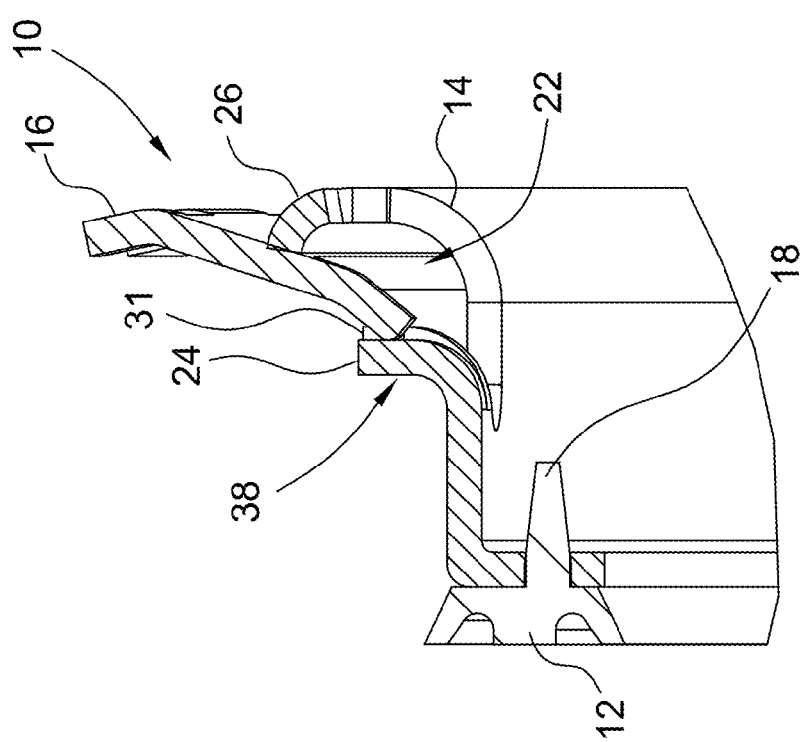

TRANSMISSION PISTON WITH CONTAINED RETURN SPRING

CROSS-REFERENCE TO RELATED APPLICATIONS

This application claims the benefit under 35 U.S.C. §119 (e) of U.S. Provisional Application No. 61/381,252 filed Sep. 9, 2010 which application is incorporated herein by reference.

FIELD OF THE INVENTION

The invention broadly relates to automobile transmissions, more specifically to piston assemblies for automobile transmissions, and even more particularly to a piston subassembly for an automobile transmission that includes a return spring.

BACKGROUND OF THE INVENTION

Automobile transmissions are well known in the art. For example, some known systems include three-piece assemblies having two pistons and an uncontained spring that must be preloaded during assembly. U.S. Pat. No. 5,893,445 (Dover) is incorporated herein by reference, and provides another example of a piston assembly for engaging the clutch of a transmission. The design in Dover includes a single piston with an overmolded seal for enabling pressurized actuation of a piston in order to engage a clutch and/or clutch pack and a split release spring retained in a slot for urging the piston away from the clutch pack. In these conventional systems, the multiple components require increased inventory management and results in an increased chance of misassembly. Overmolded seals and dual pistons can be costly to produce. Furthermore, these systems typically use the seal as a positive stop for the piston, which can lead to inefficiencies in engagement of the clutch due to the compressibility and less accurate tolerances of rubber seals.

BRIEF SUMMARY OF THE INVENTION

The present invention broadly comprises a subassembly for a transmission including a piston including at least one tab and a lip about the piston, wherein an axial gap is formed between the at least one tab and the lip, a spring element disposed in the axial gap between the at least one tab and the lip, wherein the spring element is preloaded between the at least one tab and the lip, and wherein the subassembly is formed as a single contained unit with the spring element axially and rotationally locked to the piston.

In one embodiment, the spring element includes at least one finger corresponding to the at least one tab. In one embodiment, the spring element is installable on the piston by pressing the spring element against the lip while the at least one finger is misaligned with the at least one tab, then rotating the spring element with respect to the piston for aligning the at least one finger with the at least one tab. In one embodiment, the at least one tab includes a recess for engaging with the at least one finger of spring element for locking the spring element rotationally to the piston. In one embodiment, the invention further comprises a seal having at least one protrusion and wherein the piston includes at least one hole, wherein the at least one hole is operatively arranged for receiving the at least one protrusion therein. In one embodiment, the at least one tab extends in a substantially radial direction from the piston and includes a substantially axial surface for acting as a positive stop for the piston.

The current invention also broadly comprises an assembly for a transmission comprising the current invention subassembly and a housing, wherein the subassembly is installed in the housing for engaging a clutch of the transmission. In one embodiment, the seal is operatively arranged to seal a pressure chamber of the transmission for enabling a pressure differential between axially opposite sides of the piston for actuating the piston.

The current invention also broadly comprises a subassembly for a transmission including a seal having at least one protrusion, a piston including at least one tab, and a lip about the piston, wherein an axial gap is formed between the at least one tab and the lip, the piston also including at least one hole corresponding to at least one protrusion and operatively arranged to receive the at least one protrusion for securing the seal to the piston, a spring element disposed in the axial gap between the at least one tab and the lip, wherein the spring element includes at least one finger corresponding to the at least one tab, wherein the at least one finger is aligned with the at least one tab and preloaded between the at least one tab and the lip for axially locking the spring element between the at least one tab and the lip, and wherein the at least one tab includes a recess operatively arranged for receiving the at least one finger for rotationally locking the spring element to the piston.

The current invention also broadly comprises an assembly for a transmission including the current invention subassembly and a housing, wherein the subassembly is installed in the housing for engaging a clutch of a transmission. In one embodiment, the seal is operatively arranged to seal a pressure chamber of the transmission for enabling a pressure differential between axially opposite sides of the piston for actuating the piston.

It is a general object of the present invention to provide a subassembly that is a single contained unit that can be preassembled prior to assembly of a transmission.

It is another general object of the present invention to provide a piston assembly that does not use an overmolded seal or a dual piston design.

It is yet another object of the present invention to provide a piston assembly having an improved positive stop.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is a cross-sectional view of the subassembly shown in FIG. 1;

FIG. 3 is a cross-sectional view of the subassembly of FIG. 2 installed into a transmission housing.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
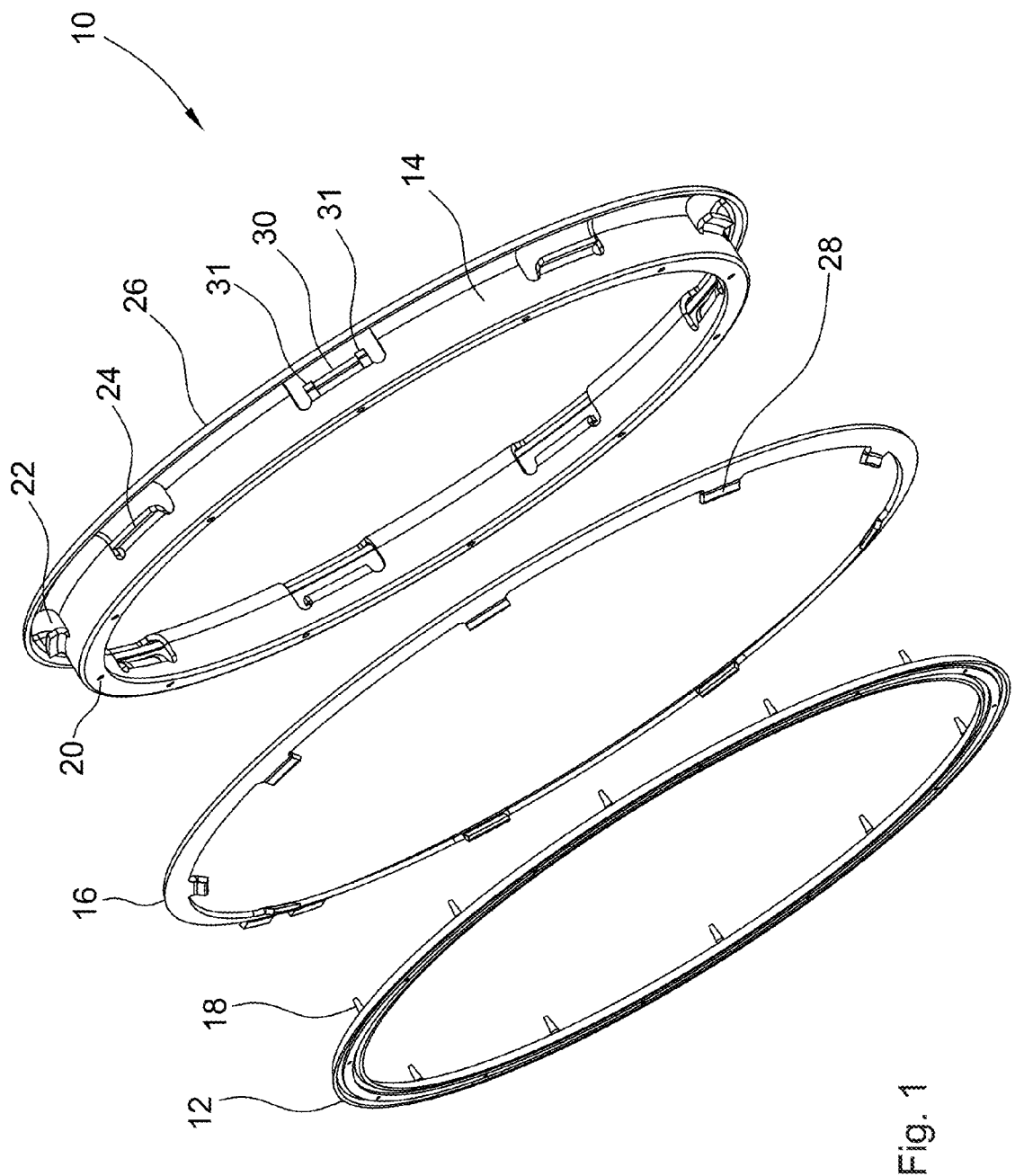
FIG. 1 is an exploded perspective view of a transmission subassembly according to the current invention.

Referring now to the figures, FIG. 1 shows subassembly 10 for an automobile transmission. Subassembly 10 includes seal 12, piston 14, and spring element 16. Seal 12 includes protrusions 18 which engage with holes 20 in piston 14 in order to secure the seal to the piston. For example, protrusions 18 could be slightly thicker than holes 20 so that the protrusions are force fit into the holes, or the protrusions could include a widened tip for retaining the seal against the piston once the widened tip is passed through hole 20.

Spring element 16 is held in axial gap 22 between tabs 24 and lip 26 of the piston. By axial, it is meant in the direction along the axis of seal 12, piston 14, and/or spring 16. Specifically, for engagement of the spring with the piston, fingers 28 of spring 16 are first misaligned with tabs 24 of the piston (that is, the fingers are aligned with the gaps between the tabs of the piston) such that spring 16 can be axially moved against lip 26. Next, the ring is compressed as needed, and rotated such that fingers 28 of the spring become aligned with tabs 24 of the piston for locking the fingers between the tabs and lip in order to prevent the spring from becoming disengaged from axial gap 22. After the spring is compressed so that it can be rotated into position with fingers 28 between tabs 24 and lip 26, axial gap 22 is not wide enough to allow the spring to return to its equilibrium position, thereby preloading the spring.

Recesses 30 are included to restrict rotation of spring element 16 with respect to piston 14. Specifically, the recesses are arranged having posts 31 included on opposite sides of each recess, with a distance between posts 31 being approximately equal to the width of the fingers of the spring element. Thus, when the spring element is rotated such that fingers 28 become aligned with tabs 24, the preloading of the spring element between the tabs and lip 26 causes designated fingers to become locked between posts 31 on either side of recess 30, thereby locking the piston and spring rotationally. That is, the spring element will uncompress into the at least one recess because of the preload, and the preload force will continue to hold the spring in the recess after assembly. By locked rotationally, it is meant that one component can not move in rotation independently from the other. It should be appreciated that recesses 30 also act to center the spring on the piston so that, for example, forces are distributed properly and so that the subassembly installs smoothly into a transmission.

As shown in FIG. 1, nine tabs 24 extend radially from the piston and included about the circumference of piston 14, while lip 26 extends radially from the piston and is provided continuously about the piston, and nine fingers 28 correspond to the nine tabs. It should, of course, be appreciated that a different number of tabs 24 or fingers 28 could be included in various embodiments of the invention, and that lip 26 need not be continuous, but could instead be included as discrete portions which extend from the piston, similar to tabs 24. In the shown embodiment, three recesses 30 can be seen (every third tab includes a recess), however, it should be appreciated that any number of tabs could be include a recess. It should also be appreciated that lip 26 extends out radially and also curves back axially in the shown embodiment, but any other arrangement suitable for preloading the spring in order to lock it in place could be substituted.

Subassembly 10 is intended to be installed into a transmission. For example, as shown in FIG. 3, subassembly 10 is installed in housing 32 of a transmission system. Housing 32 could be, for example, a hydraulic cylinder or clutch carrier component. In the shown embodiment, housing 32 includes chamber 34 which is in fluid communication with a hydraulic pressure source for enabling chamber 34 to be pressurized for actuating piston 14 axially in order to engage a clutch or clutch pack of the transmission. Seal 12 is included to prevent pressurized fluid from exiting chamber 34 in order to provide a pressure differential on axially opposite sides of piston 24. The seal is made, for example, from molded rubber. Retaining ring 36 is included to hold subassembly 10 in the transmission. Spring 16 is compressed between tabs 24 and the retaining ring when the piston is axially actuated. It should be appreciated that instead of ring 36, spring 16 could instead be arranged such that it clips into a groove in housing 32, similar to the arrangement shown in the incorporated Dover patent.

Figure 4:
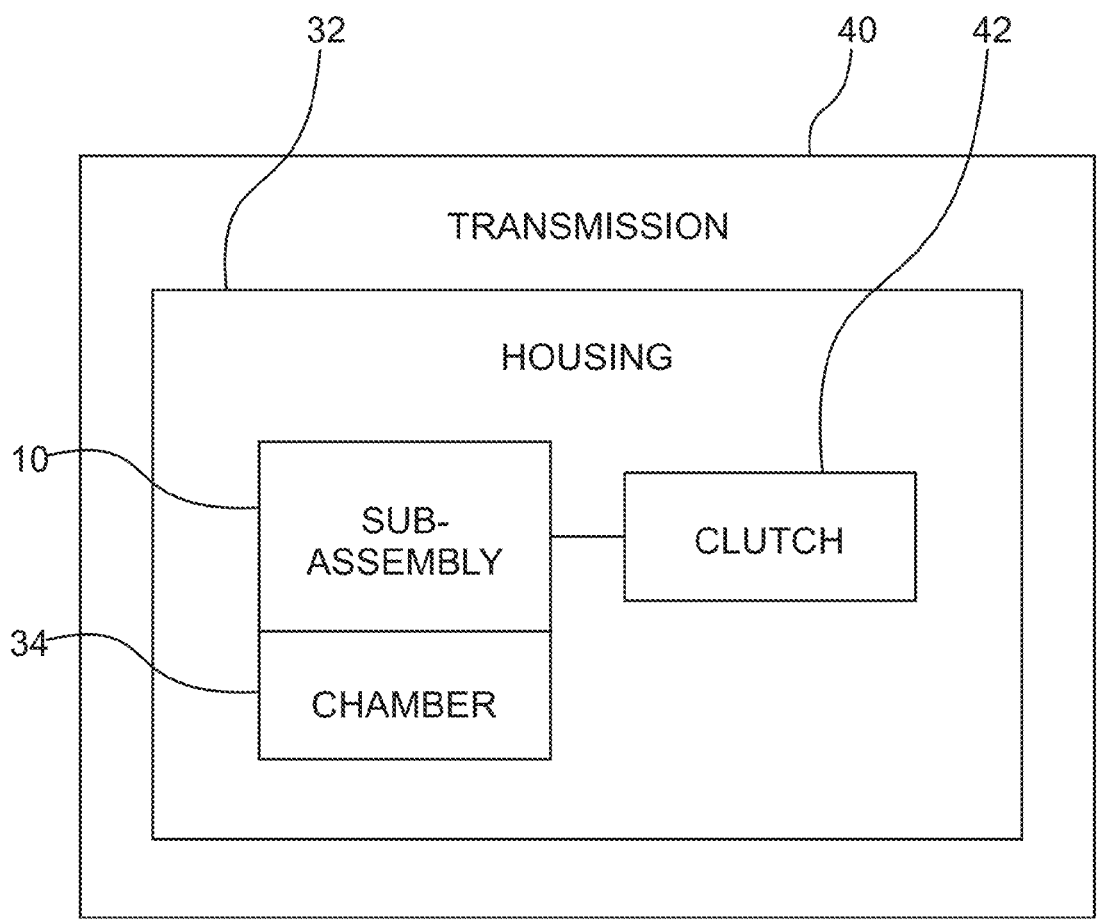
FIG. 4 is a schematic block diagram showing two clutches and a transmission.

In the shown embodiment, each tab 24 extends radially from the piston and has axial surface 38. The axial surface can be used, for example, as a positive stop for determining the position of the piston when it is fully retracted and disengaged from the clutch, as shown in FIG. 3. Thus, the axial surface of the tab can be used to matingly engage against the housing in order to determine a reference point for the piston at a high degree of accuracy for improving the tolerance stack-up between the piston and the clutch packs. FIG. 4 is a schematic block diagram showing transmission 40 with sub-assembly 10, housing 32, chamber 34 and clutch 42.

Advantageously, subassembly 10 is arranged such that it can be pre-assembled before being installed into a transmission. By pre-assembled it is meant that the components of the subassembly can be secured together into a single contained unit before being placed in a transmission, as opposed to typical piston assemblies that require a transmission housing, cylinder, carrier, or other component in order to secure all the components together. Thus, the pre-assembled nature of subassembly 10 results from seal 12 being secured to the piston via protrusions 18 which are each engaged, such as by a friction fit, in holes 20, from spring element 16 being secured axially to the piston by pressing the spring against the lip of the piston and rotating the spring element to align the tabs of the piston with the fingers of the spring element, and from the spring element being locked rotationally to the piston by preloading the spring between the tabs and lip of the piston and including a recess in at least one of the tabs.

Advantageously, the current invention results in less components having to be installed into a transmission, since subassembly 10 is a single unit. That is, the spring element is axially and rotationally locked to the piston and the seal is also secured to the piston such that subassembly 10 can be pre-assembled before installation in a transmission. For example, after subassembly 10 is created (as shown in FIG. 2), the subassembly can be installed as a single unit into a transmission. Since the subassembly is installable as a single unit, the subassembly can be checked for faults before being installed in a housing, which blocks visual inspection. Also by first assembling the return spring and seal to the piston, installation is simplified because only one component must be placed in the transmission instead of multiple individual pieces.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A subassembly for a transmission comprising:
    a piston including:
        at least one tab extending radially outward; and,
        a lip about said piston, said lip forming a radially outermost portion of said piston, wherein an axial gap is formed between said at least one tab and said lip;
    a spring element disposed in said axial gap between said at least one tab and said lip, wherein said spring element is preloaded between said at least one tab and said lip; and,
    wherein said subassembly is formed as a single contained unit with said spring element axially and rotationally locked to said piston.

2. The subassembly recited in claim 1 wherein said spring element includes at least one finger corresponding to said at least one tab.

3. The subassembly recited in claim 2 wherein said spring element is installable on said piston by pressing said spring element against said lip while said at least one finger is misaligned with said at least one tab, then rotating said spring element with respect to said piston for aligning said at least one finger with said at least one tab.

4. The subassembly recited in claim 2 wherein said at least one tab includes a recess for engaging with said at least one finger of spring element for locking said spring element rotationally to said piston.

5. The subassembly recited in claim 1, further comprising a seal having at least one protrusion and wherein said piston includes at least one hole, wherein said at least one hole is operatively arranged for receiving said at least one protrusion therein.

6. An assembly for a transmission comprising:
    the assembly of claim 5; and,
    a housing, wherein said subassembly is installed in said housing for engaging a clutch of said transmission.

7. The assembly of claim 6 wherein said seal is operatively arranged to seal a pressure chamber of said transmission for enabling a pressure differential between axially opposite sides of said piston for actuating said piston.

8. The subassembly recited in claim 1 wherein said at least one tab extends in a substantially radial direction from said piston and includes a substantially axial surface for acting as a positive stop for said piston.

9. The subassembly recited in claim 1 wherein said lip is formed from at least one discrete segment corresponding to said at least one tab.

10. A subassembly for a transmission comprising:
    a seal having at least one protrusion;
    a piston including:
        at least one tab; and,
        a lip about said piston, wherein an axial gap is formed between said at least one tab and said lip, said piston also including at least one hole corresponding to at least one protrusion and operatively arranged to receive said at least one protrusion for securing said seal to said piston;
    a spring element disposed in said axial gap between said at least one tab and said lip, wherein said spring element includes at least one finger corresponding to said at least one tab, wherein said at least one finger is aligned with said at least one tab and preloaded between said at least one tab and said lip for axially locking said spring element between said at least one tab and said lip; and,
    wherein:
        said at least one tab includes a recess operatively arranged for receiving said at least one finger for rotationally locking said spring element to said piston; and,
        no portion of the seal extends radially outward past the radially outermost portion of the piston.

11. An assembly for a transmission comprising:
    the subassembly of claim 10; and,
    a housing, wherein said subassembly is installed in said housing for engaging a clutch of a transmission.

12. The assembly of claim 10 wherein said seal is operatively arranged to seal a pressure chamber of said transmission for enabling a pressure differential between axially opposite sides of said piston for actuating said piston.

13. A subassembly for a transmission comprising:
    a piston including:
        at least one tab extending radially outward in a first radial direction; and,
        a lip forming a portion of the piston extending furthest in the radial direction;
    an axial gap, in an axial direction orthogonal to the first radial direction, between the at least one tab and the lip;
    a spring element:
        including at least one finger disposed in the axial gap;
        preloaded between the at least one tab and the lip; and,
        axially and rotationally locked to the piston.

* * * * *